(12) United States Patent
Joyce et al.

(10) Patent No.: US 7,735,645 B2
(45) Date of Patent: Jun. 15, 2010

(54) MAGNETIC TOOL ORGANIZING SYSTEM AND METHOD OF MANUFACTURING A MAGNETIC TOOL ORGANIZING SYSTEM

(75) Inventors: James C. Joyce, Naples, FL (US); Ronnie D. Kisner, Bradenton, FL (US); Robert C. Hazzard, Sarasota, FL (US)

(73) Assignee: Mag Clip Corporation, Naples, FL (US)

( * ) Notice: Subject to any disclaimer, the term of this patent is extended or adjusted under 35 U.S.C. 154(b) by 497 days.

(21) Appl. No.: 11/115,062

(22) Filed: Apr. 26, 2005

(65) Prior Publication Data

US 2005/0258059 A1    Nov. 24, 2005

Related U.S. Application Data

(63) Continuation-in-part of application No. PCT/US2004/004002, filed on Feb. 11, 2004.

(60) Provisional application No. 60/446,483, filed on Feb. 11, 2003.

(51) Int. Cl.
 B65D 85/20 (2006.01)
 A47F 7/00 (2006.01)

(52) U.S. Cl. ............. 206/350; 206/378; 206/493; 206/818; 211/70.6; 211/DIG. 1; 335/285

(58) Field of Classification Search ............. 206/350, 206/818, 375–379, 562–565, 493; 211/DIG. 1, 211/70.6; 335/285, 295; 248/206.5, 309.4, 248/467
See application file for complete search history.

(56) References Cited

U.S. PATENT DOCUMENTS

| 1,712,473 | A | | 5/1929 | McWethy | |
|---|---|---|---|---|---|
| 2,510,634 | A | * | 6/1950 | Hull | 335/285 |
| 3,141,258 | A | * | 7/1964 | Mayer | 206/350 |
| 3,405,377 | A | | 10/1968 | Pierce | |
| 3,483,494 | A | * | 12/1969 | Cromie | 206/818 |
| 3,609,015 | A | * | 9/1971 | Messinger | 248/467 |
| 3,723,928 | A | * | 3/1973 | Blakey et al. | 335/285 |
| 3,726,393 | A | | 4/1973 | Thompson | |
| 4,337,860 | A | | 7/1982 | Carrigan | |
| 4,616,796 | A | * | 10/1986 | Inoue | 335/285 |
| 5,005,590 | A | * | 4/1991 | Eldridge et al. | 206/363 |
| 5,448,806 | A | | 9/1995 | Riceman et al. | |
| 5,473,799 | A | * | 12/1995 | Aoki | 335/285 |
| 5,501,342 | A | | 3/1996 | Geibel | |

(Continued)

FOREIGN PATENT DOCUMENTS

JP    6-80176    *    3/1994

(Continued)

*Primary Examiner*—Bryon P Gehman
(74) *Attorney, Agent, or Firm*—The Webb Law Firm

(57) ABSTRACT

A magnetic tool organizing system including a base substrate having an inner base substrate area, a base substrate front surface and a base substrate rear surface; at least one magnetic element positioned at least partially within the inner base substrate area. In one embodiment, a cover element, including a rim portion, is positioned adjacent the at least one magnetic element, and the rim portion of the cover element is at least partially embedded within an area of the base substrate In another embodiment, the magnetic element is embedded in the inner base substrate area. Methods of manufacturing a magnetic tool organizing system are also disclosed.

20 Claims, 7 Drawing Sheets

U.S. PATENT DOCUMENTS

| | | |
|---|---|---|
| 5,743,394 A | 4/1998 | Martin |
| 5,848,700 A | 12/1998 | Horn |
| 5,855,285 A | 1/1999 | Laird et al. |
| 5,904,096 A * | 5/1999 | Fawcett et al. ............... 335/285 |
| 5,983,464 A | 11/1999 | Bauer |
| 6,039,178 A | 3/2000 | Ernst |
| 6,073,766 A * | 6/2000 | Winnard ..................... 206/350 |
| 6,092,655 A | 7/2000 | Ernst |
| 6,311,838 B1 | 11/2001 | Johnson et al. |
| 6,431,373 B1 | 8/2002 | Blick |
| 6,571,966 B1 * | 6/2003 | Hsiao ........................ 211/70.6 |
| 6,644,617 B2 | 11/2003 | Pitlor |
| 6,702,112 B1 * | 3/2004 | Henderson .................. 206/350 |
| 6,892,428 B2 | 5/2005 | Reitler |
| 6,895,642 B2 | 5/2005 | Huang |
| 7,131,616 B2 | 11/2006 | Livingstone |
| 2006/0237605 A1 | 10/2006 | Joyce et al. |
| 2007/0023304 A1 * | 2/2007 | Joyce et al. .................. 206/350 |

FOREIGN PATENT DOCUMENTS

WO         9626870 A1     9/1996

* cited by examiner

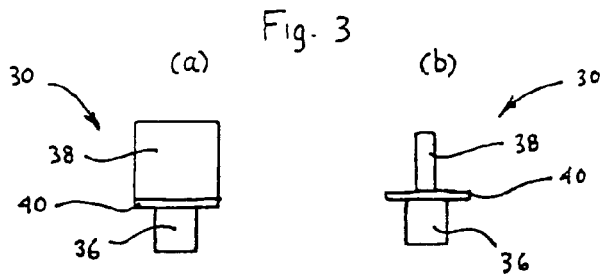
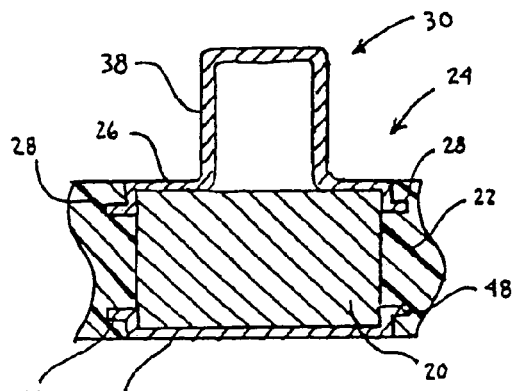
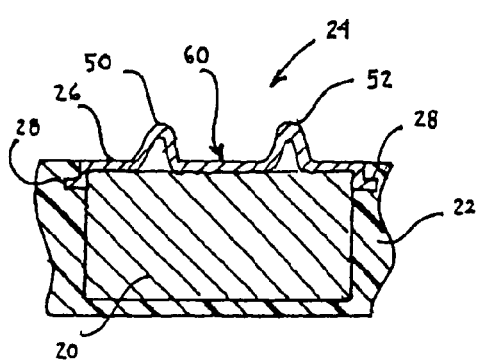
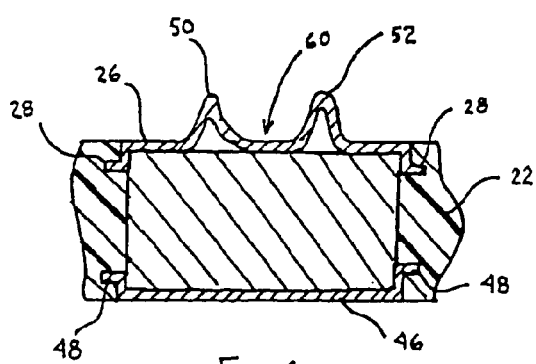
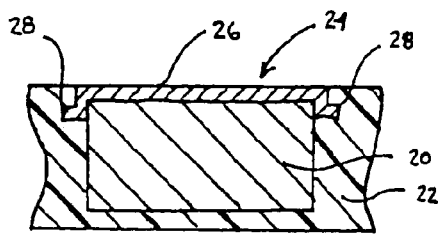
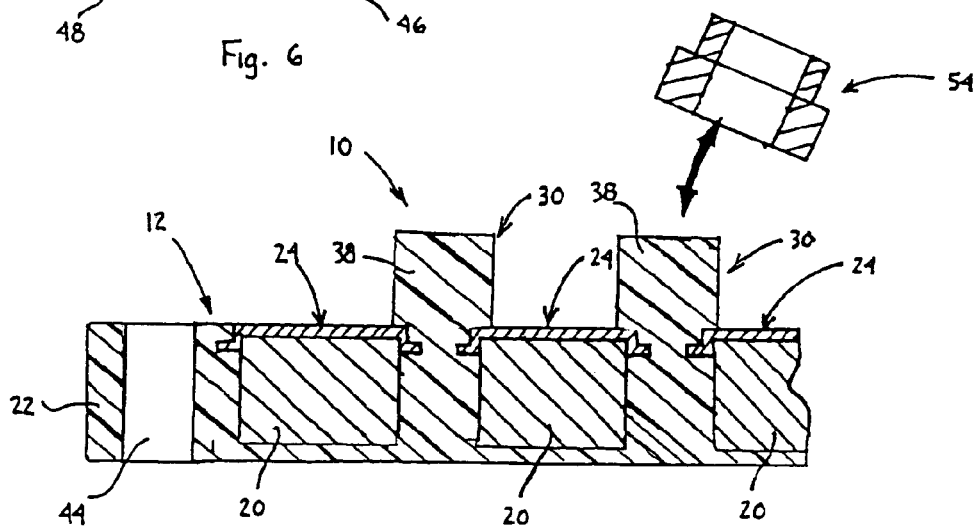

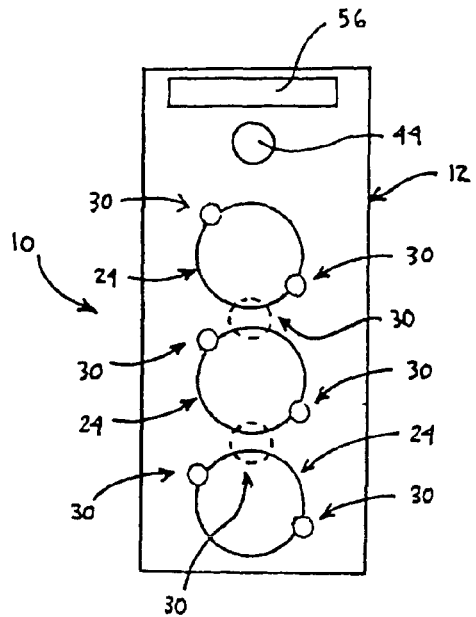
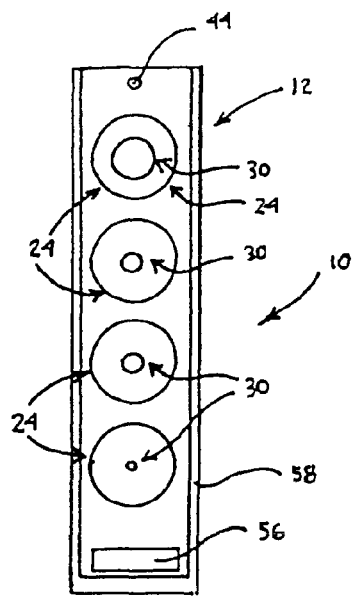
Fig. 9　　　　Fig. 10
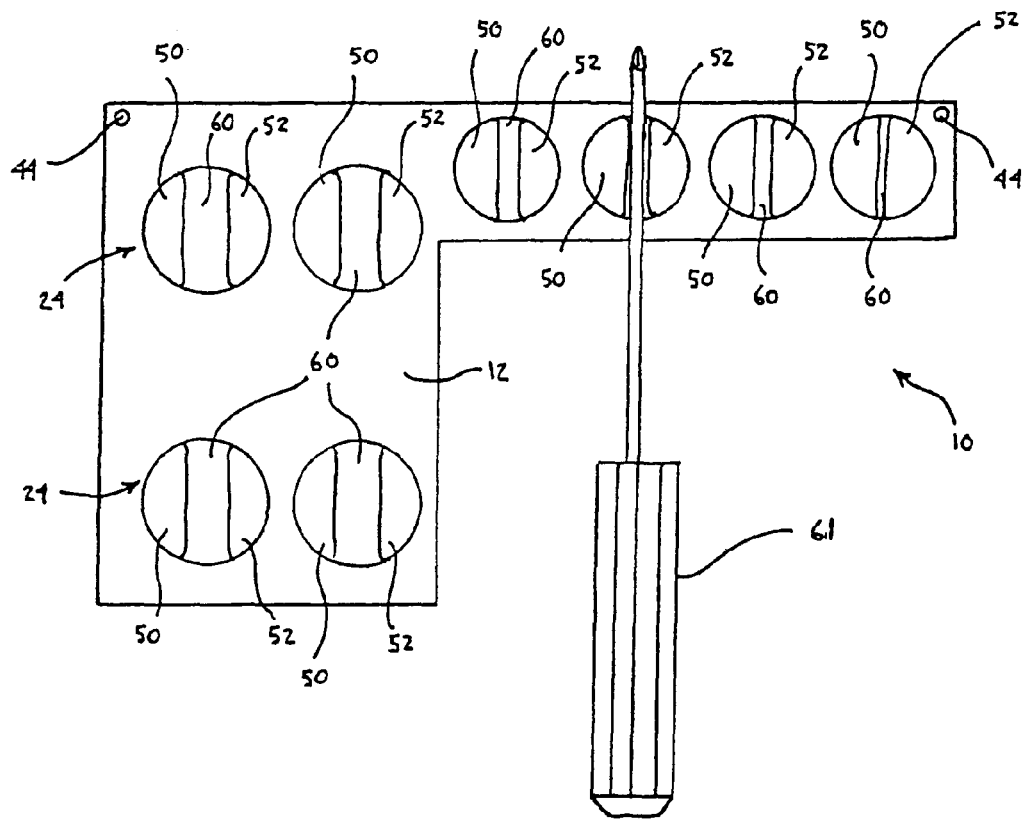
Fig. 11

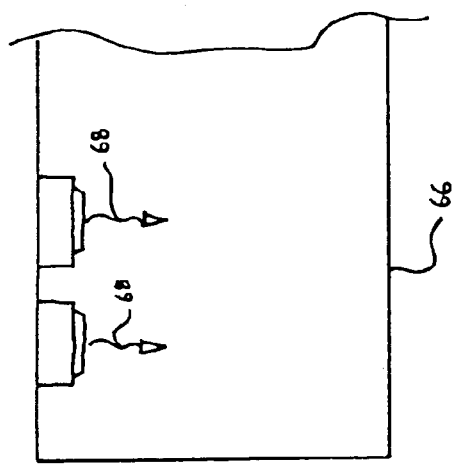
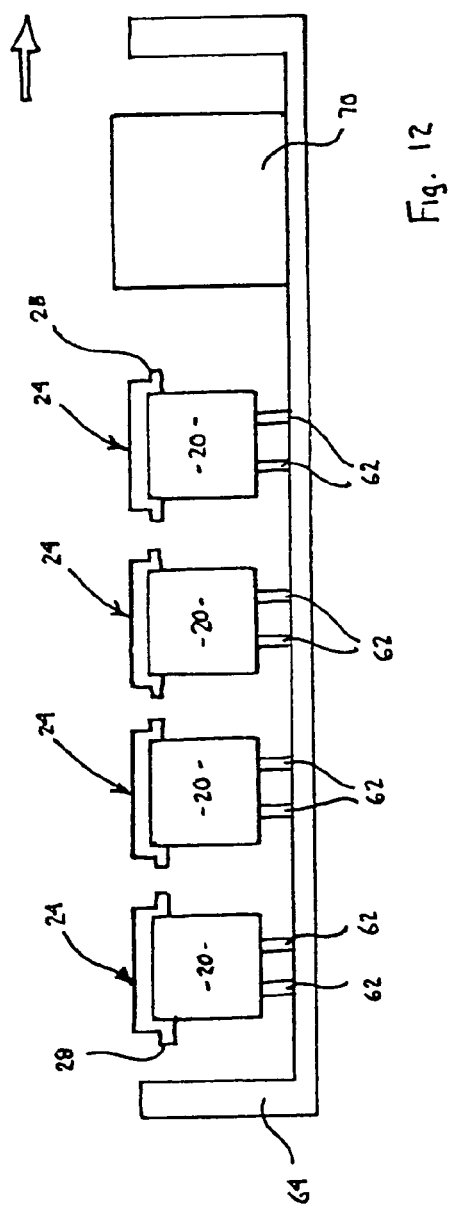
Fig. 12
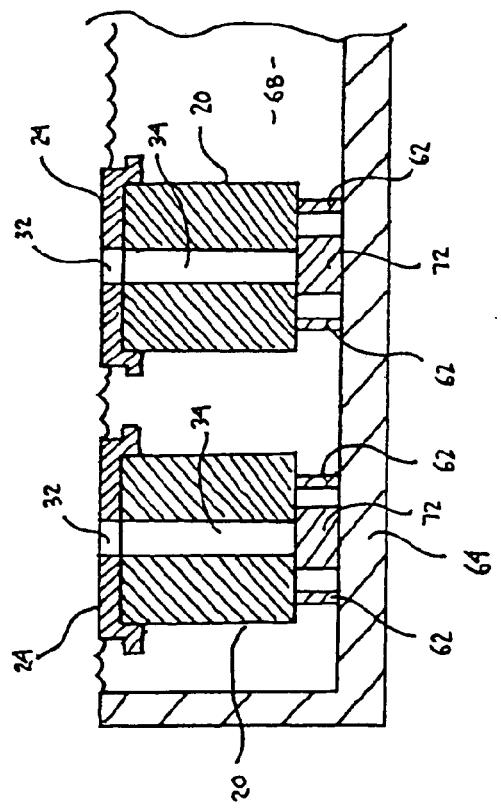
Fig. 13

MAGNETIC TOOL ORGANIZING SYSTEM AND METHOD OF MANUFACTURING A MAGNETIC TOOL ORGANIZING SYSTEM

CROSS REFERENCE TO RELATED APPLICATIONS

This application is a continuation-in-part of PCT/US2004/004002, filed Feb. 11, 2004, which claims priority of U.S. Patent Application No. 60/446,483, filed Feb. 11, 2003, both of which are incorporated herein by reference in their entirety.

BACKGROUND OF THE INVENTION

1. Field of the Invention

The present invention relates generally to tool and component part organization systems and structures and, in particular, to magnetic-based tool and component part organization systems.

2. Description of Related Art

In order to provide organization to one's work area, some type of system or structural arrangement is often desired. For example, as a person collects tools and tool parts over a period of time, he or she may require some manner of organizing and positioning these tools and parts for easy access and recall. One example of a tool holding device is found in U.S. Pat. No. 5,743,394 directed to a magnetic socket holder. While the socket holder disclosed in this reference uses magnetic force, other tool attachment and organization means are known in the art. For example, in a typical tool chest, a slideable drawer with segregated compartments is used. For tool organization structures that hang on the wall and are oriented in a vertical plane, clips or other attachment devices can be used. Examples of other magnet-based organizing systems may be found in U.S. Pat. Nos. 6,039,178; 6,431,373; 6,092,655; 5,855,285; 4,337,860; 3,726,393; 3,405,377; and 1,712,473. However, such prior art systems have many drawbacks.

When using mechanical clips to hold tools and tool components in place, such clips are subject to breaking or they require excessive force to remove the tool from the clip. Tool chest trays are often inconvenient since a user will often place multiple and stacked tools and other construction components within the tray, which, in turn, leads to additional disorganization and inability to easily locate the desired tool or component.

Typical magnetic tool organization systems use economical magnets, such as flexible magnets or ceramic magnets, that do not have sufficient holding power to allow storage of many tools in a vertical orientation, such as on a wall, a vertical pegboard, the side of a metal toolbox, etc. While ceramic magnets do offer more holding power than flexible magnets, products utilizing ceramic magnets are still deficient in holding power for heavy tools and are expensive to manufacture due to the inherent fragility of the ceramic magnets, which leads to product loss during manufacture. Further, this inherent fragility causes a substantially less than desired product life because of breakage during normal use. Also, prior art structures and arrangements have poor product life, are subject to breakage and loss and are difficult to manufacture.

SUMMARY OF THE INVENTION

It is, therefore, an object of the present invention to provide a magnetic tool organizing system that overcomes the deficiencies of the prior art. It is another object of the present invention to provide a magnetic tool organizing system that uses magnets with sufficient holding power to removeably secure tools in a vertical manner. It is yet another object of the present invention to provide a magnetic tool organizing system that is sturdy and not easily separated into multiple parts or easily broken. It is a further object of the present invention to provide a method of manufacturing a magnetic tool organizing system that overcomes the deficiencies of the prior art.

The present invention is directed to a magnetic tool organizing system that includes a base substrate having an inner base substrate area, a base substrate front surface and a base substrate rear surface. The system further includes at least one and typically multiple magnetic elements positioned at least partially within the base substrate inner area. A cover element is positioned substantially adjacent a corresponding magnetic element. This cover element includes a rim portion, and this rim portion is at least partially embedded within an area of the base substrate. Due to the embedded nature of the rim portion of the cover element, the corresponding magnetic element is secured within the base substrate.

In a preferred embodiment, the cover element is either integral with or in communication with a projecting element, which extends away from the base substrate. Since the projecting element is in magnetic communication with the magnetic element, the resulting magnetic force, coupled with the positioning of a tool or tool component on the projecting element, removeably secures the tool or tool component against the base substrate.

The present invention is further directed to a method of manufacturing a magnetic tool organizing system. In a preferred embodiment, this method includes the steps of: (a) embedding at least one magnetic element within a base substrate; and (b) at least partially embedding at least a portion of a cover element within the base substrate. The cover element is positioned substantially adjacent the magnetic element in the base substrate. In a further preferred embodiment, the cover element includes a rim portion, and the rim portion is at least partially embedded within the base substrate.

In a still further preferred and non-limiting embodiment, the method includes the steps of: positioning at least one magnetic element on at least one peg element extending from a form; positioning a cover element substantially adjacent the magnetic element; placing a form in a molding mechanism; and injecting a moldable material into the form, such that the moldable material at least partially surrounds the magnetic element and at least a portion of the cover element. The injected moldable material forms the base substrate.

In yet another preferred and non-limiting embodiment, the present invention is directed to a magnetic tool organizing system having a base substrate with an inner base substrate area, a base substrate front surface and a base substrate rear surface. At least one magnetic element is positioned at least partially in the inner base substrate area of the base substrate. Further, the base substrate front surface and the base substrate rear surface substantially surround the magnetic element, such that the magnetic element is embedded in the inner base substrate area of the base substrate. In a further embodiment, the base substrate is manufactured from a pliable, flexible and/or bendable material. In addition, in yet another embodiment, multiple base substrates, each with embedded magnetic elements, are attached to each other along a periphery of each substrate.

In a still further preferred and non-limiting embodiment, the present invention is directed to a method of manufacturing a magnetic tool organizing system. This method includes the step of at least partially embedding one or more magnetic elements within a base substrate. In particular, the magnetic elements would be embedded within an inner base substrate area of the base substrate.

The present invention, both as to its construction and its method of operation, together with the additional objects and advantages thereof, will best be understood from the following description of exemplary embodiments when read in connection with the accompanying drawings.

BRIEF DESCRIPTION OF THE DRAWINGS

FIG. 3(a) is a side view of a removable projecting element of a magnetic tool organizing system according to the present invention;

FIG. 3(b) is a side view of a further embodiment of a removable projecting element of a magnetic tool organizing system according to the present invention;

FIG. 4 is a partial side sectional view of a further embodiment of a magnetic tool organizing system according to the present invention;

FIG. 5 is a partial side sectional view of a further embodiment of a magnetic tool organizing system according to the present invention;

FIG. 6 is a partial side sectional view of a further embodiment of a magnetic tool organizing system according to the present invention;

FIG. 7 is a partial side sectional view of a further embodiment of a magnetic tool organizing system according to the present invention;

FIG. 8 is a partial side sectional view of a further embodiment of a magnetic tool organizing system according to the present invention;

FIG. 9 is a top view of a magnetic tool organizing system according to the present invention;

FIG. 10 is a top view of a magnetic tool organizing system according to the present invention;

FIG. 11 is a top view of a magnetic tool organizing system according to the present invention;

FIG. 12 is a schematic view of a method of manufacturing a magnetic tool organizing system according to the present invention; and FIG. 13 is a side sectional view of a an intermediate step in a further embodiment of a method of manufacturing a magnetic tool organizing system according to the present invention;

DESCRIPTION OF THE PREFERRED EMBODIMENTS

Figure 17:
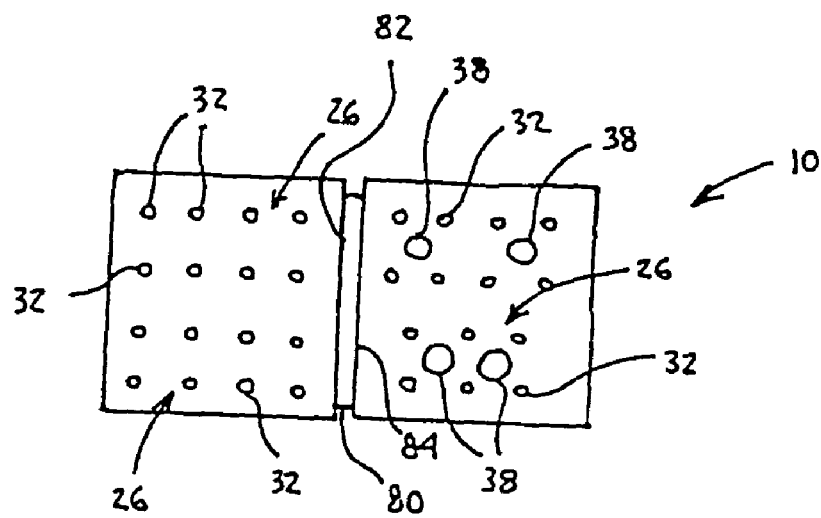
FIG. 17 is a top view of a still further embodiment of a magnetic tool organizing system according to the present invention.
Figure 18:
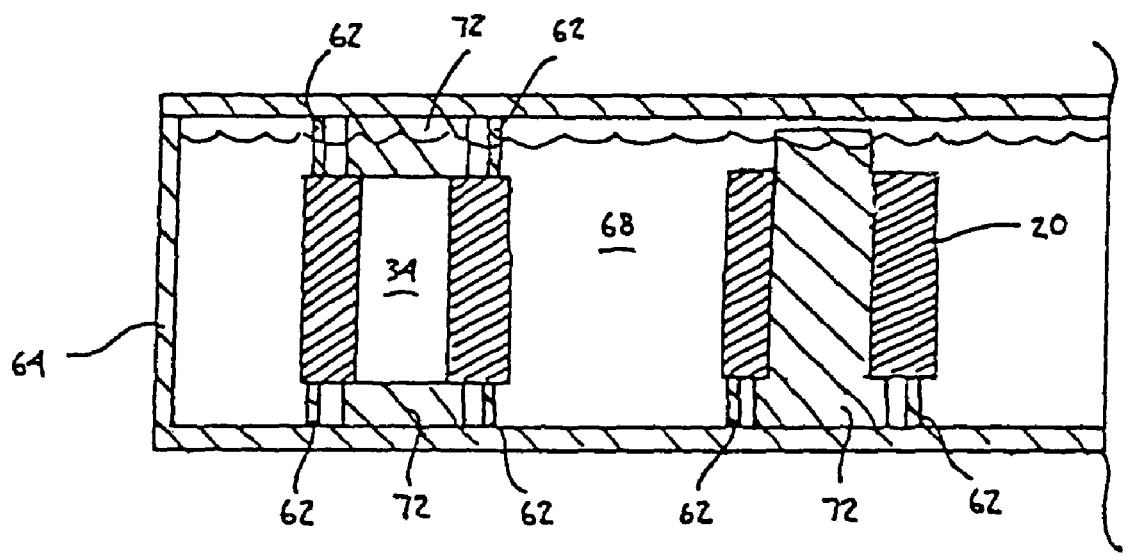
FIG. 18 is a side sectional view of an intermediate step in a still further embodiment of a method of manufacturing a magnetic tool organizing system according to the present invention.

The present invention is a magnetic tool organizing system 10, as illustrated in various embodiments in FIGS. 1-11 and 14-17, and a method of manufacturing the magnetic tool organizing system 10, as illustrated in various preferred and non-limiting embodiments in FIGS. 12, 13 and 18. In one embodiment, the system 10 includes a base substrate 12 having an inner substrate area 14, a base substrate front surface 16 and a base substrate rear surface 18. The system 10 also includes at least one and typically multiple magnetic elements 20. Each magnetic element 20 is positioned in a respective inner substrate area 14. If the inner substrate area 14 consists of a recess, the magnetic element 20 may contact an inner surface 22 of the base substrate 12. Immediately adjacent the magnetic element 20 is a cover element 24. The cover element 24 includes an interface portion 26 and a rim portion 28. The rim portion 28 is spaced from and extends from the interface portion 26. In construction, the interface portion 26 abuts the magnetic element 20, and the rim portion 28 extends into the base substrate 12. The resulting structure allows the cover element 24 to further secure the magnetic element 20 in the inner substrate area 14.

In a preferred embodiment, the base substrate 12 is manufactured from a polymeric material, such as plastic or other similar moldable material. The cover element 24 is constructed from a metallic material, such that the magnetic force of the magnetic element 20 is imparted upon and magnetizes the cover element 24. All of the cover elements 24, magnetic elements 20 and base substrate 12 are manufactured as an integral and molded piece. However, it is envisioned that any one or more of the base substrate 12 and the cover element 24 are manufactured from a plastic, a polymeric material, a metal, a semi-metal, a synthetic material and a moldable material. In a preferred embodiment, the cover element 24 is manufactured from a metallic material, wherein the field of the magnetic element 20 is imparted onto the cover element 24. However, the cover element 24 may be manufactured from a less expensive synthetic material, such as plastic, which would allow the field of the magnetic element 20 to emanate through the cover element 24.

Figure 1:
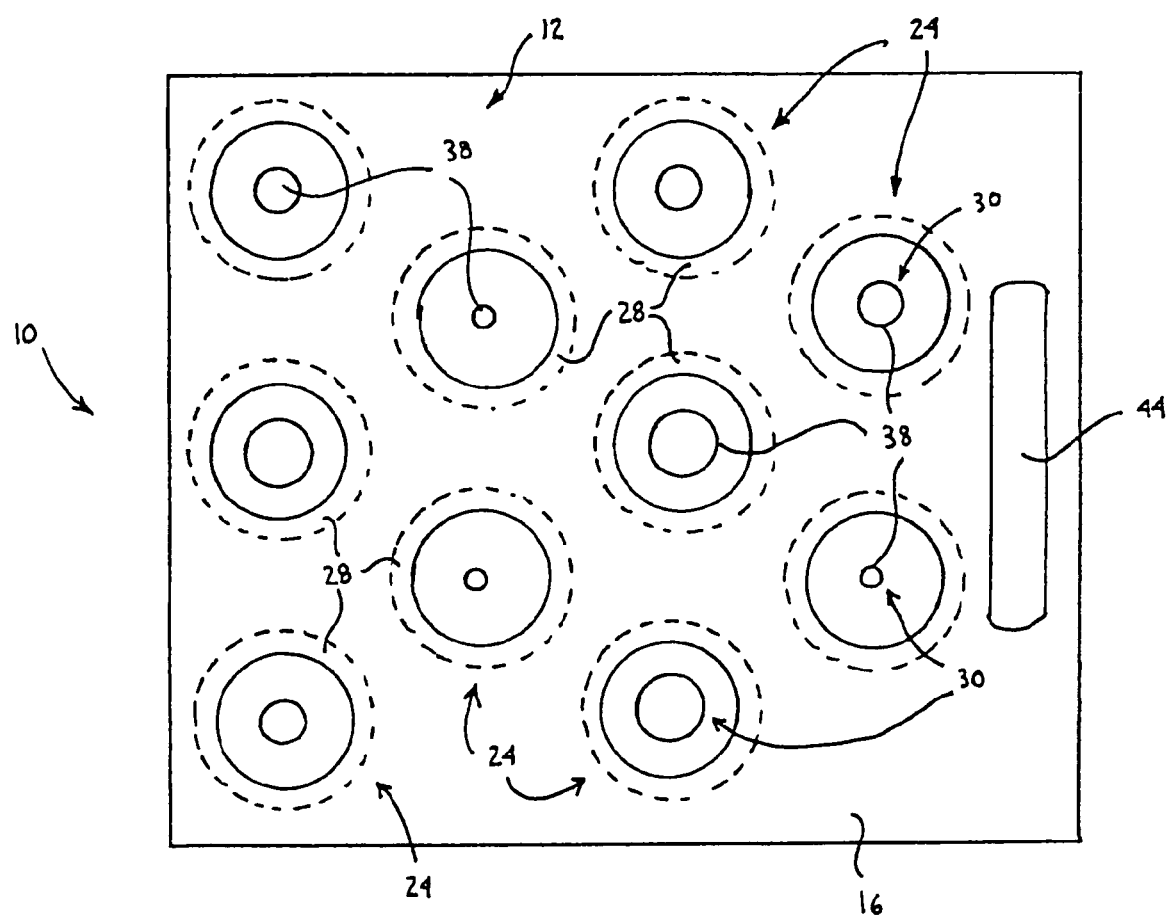
FIG. 1 is a top view of a magnetic tool organizing system according to the present invention.
Figure 2:
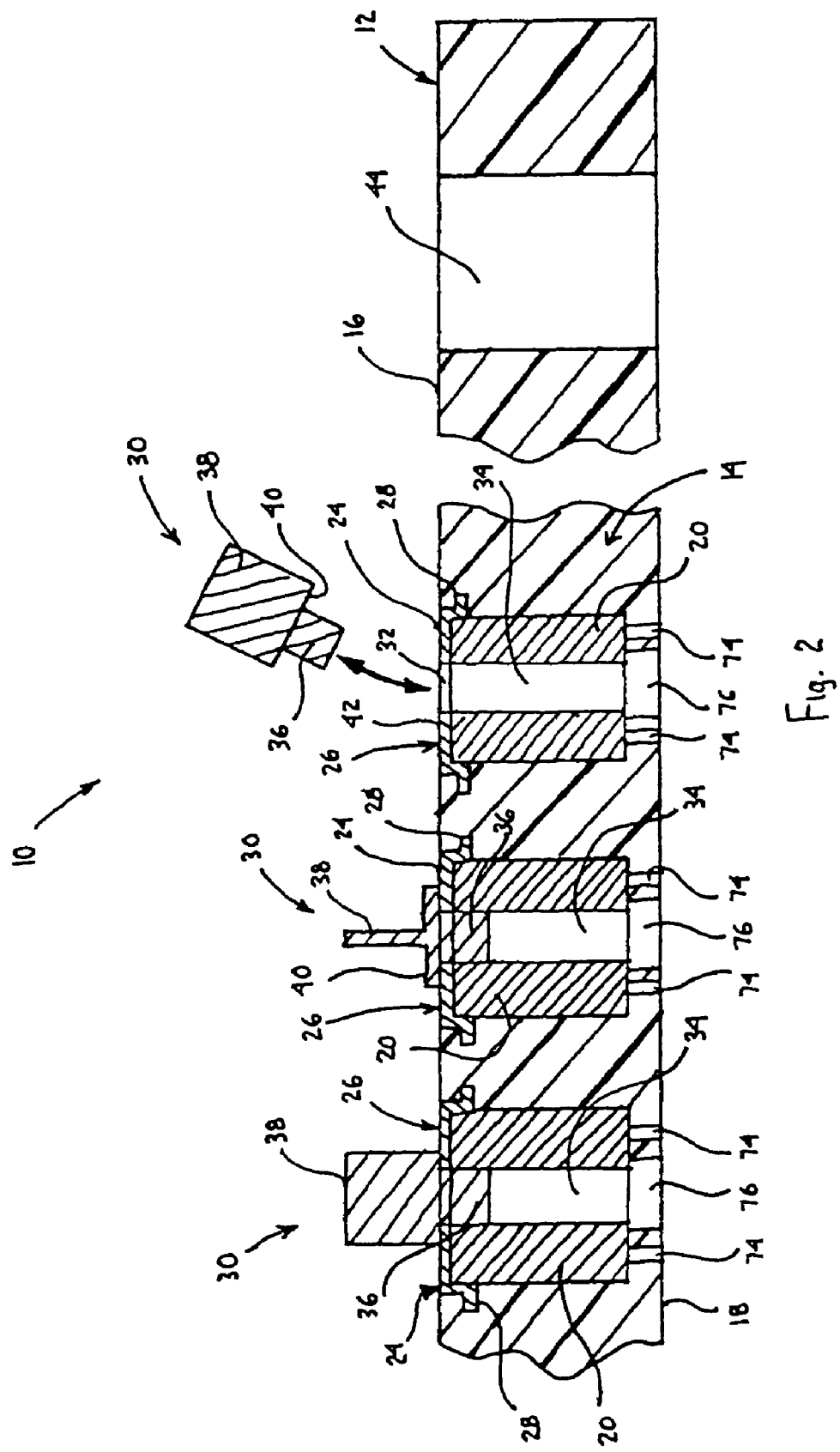
FIG. 2 is a partial side sectional view of a preferred embodiment of a magnetic tool organizing system according to the present invention.

As seen in FIGS. 1 and 2, in one preferred and non-limiting embodiment, the base substrate 12 includes a substantially planar front surface 16 having multiple magnetic elements 20 positioned in the inner substrate area 14 and cover elements 24 positioned on the front surface 16. In this embodiment, the cover element 24 includes a removeable projecting element 30 extending from the base substrate 12 and the interface portion 26 of the cover element 24. As seen in FIG. 2, the cover element interface portion 26 has an interface portion orifice 32 extending therethrough. Further, the magnetic element 20 includes a magnetic element orifice 34 extending at least partially therethrough. The projecting element 30 includes an insertion portion 36 and an extension portion 38. Further, the projecting element 30 has a projecting element rim portion 40 extending from a side surface of the projecting element 30.

In this embodiment, the projecting element 30 is sized and shaped so as to be insertable through the interface portion orifice 32 and at least partially into the magnetic element orifice 34. Specifically, the insertion portion 36 of the projecting element 30 is inserted through the interface portion orifice 32 and into the magnetic element orifice 34 until the projecting element rim portion 40 abuts an interface portion outer surface 42. In addition, the projecting element 30 is manufactured from a material, such as a metallic material, that is capable of being held in place by the force of the magnetic element 20.

In operation, the projecting element 30 is insertable in and removeable from the magnetic element orifice 34, and when fully inserted, the extension portion 38 provides a support area for a tool, a tool component, etc. However, the projecting element 30 need not be removable, and may be integral with the base substrate 12, the cover element 24, etc. In a preferred embodiment, the projecting element 30 is substantially tubular, thereby allowing a tool or a tool component with a substantially circular orifice to be placed thereon.

The base substrate 12 can be in the form of a shelf or a hangable board, and as seen in FIGS. 1 and 2, the base substrate 12 can include a base substrate orifice 44 extending therethrough. Depending upon the size and shape of the base substrate orifice 44, it can be used as a graspable handle or a means for mounting the base substrate 12 on a vertical wall or structure. For example, the base substrate orifice 44 may include indentations thereon for allowing a user to grasp the base substrate 12 with his or her hands, with fingers resting on the indentations.

The projecting element 30 may have various sizes and shapes. See FIG. 2. Two such shapes are shown in FIGS. 3(a) and 3(b). In FIG. 3(a), the extension portion 38 is wider or has a larger diameter than the insertion portion 36. This would allow for larger tools or components to be placed thereon. In FIG. 3(b), the extension portion 38 is narrower or has a smaller diameter than the insertion portion 36 for use in connection with smaller tools and components. In either case, the projecting element rim portion 40 is sized such that the projecting element 30 is not inserted further than necessary or desired into the magnetic element orifice 34. This variability in size of the extension portion 38, together with the uniformity of the insertion portion 36, allows for overall greater flexibility in storing different sized and shaped tools and components by the magnetic tool organizing system 10. This functionality also allows the user to create his or her own arrangements for achieving his or her personal organizational goals.

In another preferred and non-limiting embodiment, as illustrated in FIG. 4, the cover element 24 does not have a separate projecting element 30, instead it has an integrated projecting element 30 with an extension portion 38 as part of the interface portion 26. Since the cover element 24 is embedded in the base substrate 12, the projecting element 30 and extension portion 38 are not removeable in this embodiment. Further, the magnetic element 20 need not include a magnetic element orifice 34, since the projecting element 30 does not include an insertion portion 36, but it could include a magnetic element orifice 34. In order to support and secure the magnetic element 20 within the inner substrate area 14, a rear-securing element 46 can be used. As with the cover element 24, the rear-securing element 46 includes a rim portion 48 that, like the rim portion 28 of the cover element 24, extends into the base substrate 12, and specifically the area in the base substrate 12 immediately surrounding the magnetic element 20.

In another similar embodiment, as shown in FIG. 5, rather than include a single extension portion 38, the cover element 24 includes a first extension portion 50 and a second extension portion 52. The first extension portion 50 and the second extension portion 52 are in the form of projecting ridges between which a tool or component can be located and attached. In this embodiment, the magnetic element 20 does not include a magnetic element orifice 34, and neither does this embodiment include a rear-securing element 46, instead the magnetic element 20 is secured by the inner surface 22 of the base substrate 12 in the inner substrate area 14.

Yet another embodiment is illustrated in FIG. 6. This embodiment includes the first extension portion 50 and the second extension portion 52, and further includes the rear-securing element 46 under the magnetic element 20. However, in this embodiment, the first extension portion 50 and the second extension portion 52 extend and project further than the identical portions of the embodiment illustrated in FIG. 5. This illustrates the variation that can be achieved using different dimensions and shapes of extension portions 50, 52.

In a basic form, and in a still further preferred and non-limiting embodiment, the cover element 24 has a planar interface portion 26 and does not have any projecting element 30. In addition, the interface portion 26 is immediately adjacent and secures a magnetic element 20, which does not include a magnetic element orifice 34. This embodiment does not use any rear-securing element 46. In operation, a user would merely place a tool or component against the cover element 24, which has a magnetized surface as a result of its contact with the magnetic element 20. Therefore, the tool or component would be secured directly to the cover element 24.

In another embodiment, as shown in FIG. 8, the projecting element 30 is molded or manufactured as an integral part of the base substrate 12. Therefore, the cover element 24 does not include an interface portion orifice 32. Disposed on either side of the projecting element 30 is a corresponding cover element 24, together with a corresponding magnetic element 20 positioned beneath the cover element 24. In this embodiment, a tool or component 54 is placed over the extension portion 38 of the projecting element 30 and is held in place by the magnetic force projected by the adjacent cover elements 24 and magnetic elements 20. As discussed in connection with the removeable and integral projecting elements 30 of the cover element 24, in this embodiment, the projecting elements 30 can also have multiple sizes and shapes to increase the flexibility and utility of the magnetic tool organizing system 10.

As seen in FIG. 9, multiple projecting elements 30 can be located near a distal area of the cover element 24, under which a magnetic element 20 is located. Therefore, in this embodiment, multiple projecting elements 30 would use a single magnetic force projected from a single magnetic element 20 disposed therebetween. Also shown in this embodiment, is a label area 56, which may be in the form of an area suitable for an applied label, an engraveable placard, or other means of identifying the magnetic tool organizing system 10. As seen in FIGS. 8 and 9, and in order to increase the magnetic force exerted on the tool or component, the projecting elements 30 may be positioned and/or located partially overlapping the cover element 24. For example, in FIG. 9, the projecting elements 30 may partially overlap the cover element 24 in a diagonal position with respect to a single cover element 24, or, alternatively, a single projecting element 30 can straddle two or more cover elements 24. Any number of arrangements and configurations are envisioned that would allow the projecting element 30 and, consequently the tool or component, to experience the maximum securing magnetic force.

In another such embodiment, as shown in FIG. 10, the magnetic tool organizing system 10, and specifically the base substrate 12, may include a raised outer ledge 58 running partially or wholly around the base substrate 12. This ledge 58 would act as a guard for the tools and components placed thereon, and further may act as a safety or precautionary measure to a user or area surrounding the base substrate 12. Also, when the base substrate 12 is used in the form of a drawer or horizontal platform, the ledge 58 would prevent the tool or component from sliding off the base substrate 12 if it is jarred or improperly placed.

FIG. 11 illustrates a still further embodiment of the magnetic tool organizing system 10. In this embodiment, multiple cover elements 24 having magnetic elements 20 positioned below them in a respective inner substrate area 14 are spaced about the surface of the base substrate 12. Further, in this embodiment, each of the cover elements 24 includes an integral first extension portion 50 and second extension portion 52. In order to increase flexibility, a depressed portion 60 located between the first extension portion 50 and the second extension portion 52 have varying diameters or widths. The larger diameter depressed portions 60 can be used to house and hold larger tools, while the smaller diameter depressed portions 60 can be used to house and hold smaller tools, for example a screwdriver 61 or the like. In addition, in this embodiment, multiple base substrate orifices 44 are shown so that the base substrate 12 can be hung or attached to a vertical surface.

While many of the embodiments show a circular or tubular-shaped projecting element 30, cover element 24 and magnetic element 20, this is only a matter of preference and efficiency in manufacturing. It is also envisioned that the projecting element 30, the cover element 24 and the magnetic element 20 can be any size or shape so as to effectively engage with and secure tools or components to the base substrate 12. Similarly, the base substrate orifice 44 or orifices can be formed to provide for the best possible manipulation and functionality of the magnetic organizing system 10.

The present invention is also directed to a method of manufacturing the magnetic tool organizing system 10. The magnetic element 20 is embedded within the base substrate 12, and the cover element 24 is positioned adjacent the magnetic element 20 and at least partially embedded within the base substrate 12, typically at the location of the rim portion 28. In one preferred and non-limiting embodiment, the base substrate 12 is manufactured by an injection molding process using moldable material, such as plastic or a polymeric material.

As seen in FIG. 12, in another embodiment, the method includes the steps of: positioning at least one, and typically multiple, magnetic elements 20 on corresponding peg elements 62 extending from and/or attached to a form 64; and positioning a cover element 24 on top of each magnetic element 20. Next, the form 64 is placed in an injection molding device 66, and a moldable material 68 is injected into the form 64. Specifically, enough moldable material 68 is injected such that the moldable material 68 at least partially surrounds the magnetic elements 20 and at least a portion of the cover elements 24, typically the rim portion 28 of the cover element 20. Finally, the moldable material 68 is allowed to solidify as it cools, thereby forming the base substrate 12 with embedded magnetic elements 20 and cover elements 24. Further, in this embodiment, in order to provide the base substrate orifice 44, such as in the form of a handle, a form insert 70 is used. Specifically, this form insert 70 allows the moldable material 68 to flow around the body of the form insert 70 and, once solidified, the base substrate 12 now includes the base substrate orifice 44. This form insert 70 may be attached to or integral with the form 64.

Yet another embodiment of the method of manufacturing the magnetic tool organizing system 10 is illustrated in FIG. 13. In this embodiment, the cover element 24 includes the interface portion orifice 32, and similarly, the magnetic element 20 includes the magnetic element orifice 34. Therefore, in order to prevent the moldable material 68 from flowing into the magnetic element orifice 34 and the interface portion orifice 32, a central peg element 72 is placed in between the one or more peg elements 62. The central peg element 72 serves to block or prevent the moldable material 68 from flowing into the magnetic element orifice 34. Preferably, the central peg element 72 has a diameter or width larger than the diameter or width of the magnetic element orifice 34. However, any manner of preventing the moldable material 68 from flowing into the magnetic element orifice 34 and the interface portion orifice 32 is envisioned.

When utilizing this embodiment of the method of manufacturing the magnetic tool organizing system 10, the resulting base substrate will include corresponding openings or orifices. Specifically, and as seen in FIG. 2, the resulting and solidified base substrate 12 will include peg element orifices 74 extending from the magnetic element 20 to the base substrate rear surface 18. Similarly, the resulting structure will include a central peg element orifice 76 extending between the magnetic element orifice 34 and the base substrate rear surface 18. However, since the peg element orifices 74 and the central peg element orifices 76 are spaced, the magnetic element 20 remains embedded within and molded into the base substrate 12.

Once the base substrate 12, magnetic elements 20 and cover elements 24 are formed, if so desired, a removable projecting element 30 may be inserted into or otherwise engaged with a respective magnetic element 20 and/or cover element 24. Further, any of the base substrate 12, the magnetic elements 20 and the cover elements 24 may be manufactured or formed in the desired shapes and sizes and from the materials as discussed above in connection with the embodiments of the magnetic tool organizing system 10.

In a further preferred and non-limiting embodiment, and as illustrated in FIGS. 14-17, the present invention is also directed to a magnetic tool organizing system 10, where the base substrate front surface 16 and the base substrate rear surface 18 substantially surround the magnetic element 20. In this manner, the magnetic element 20 is embedded in the inner base substrate area 14. Accordingly, with respect to the previous embodiments of the system 10, the present embodiment does not include the above-discussed cover element 24, instead totally encapsulating the magnetic element 20 within the base substrate 12.

Figure 14:
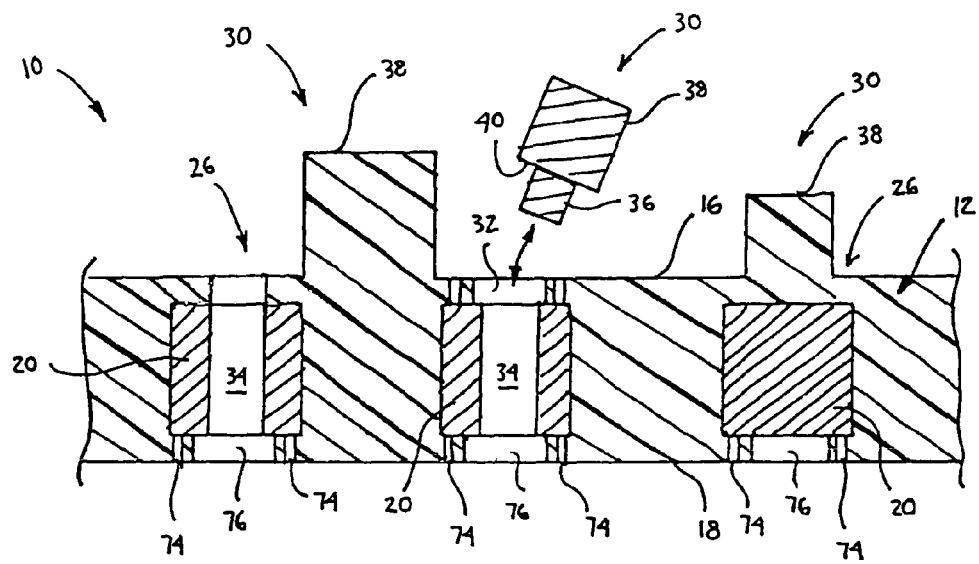
FIG. 14 is a partial side sectional view of a further preferred embodiment of a magnetic tool organizing system according to the present invention.

As best seen in FIG. 14, the system 10 of the present embodiment may still take the various forms and shapes discussed above. In this embodiment, the base substrate 12 and the magnetic element 20 are manufactured as an integral piece in a molding process. As discussed above, the system 10 may include the projecting element 30 extending from the base substrate 12. Also, the interface portion 26 now becomes a specific area on the base substrate front surface 16 and/or base substrate rear surface 18. Accordingly, the interface portion 26 may include the interface portion orifice 32, which allows the insertion of the insertion portion 36 or some other object through the interface portion orifice 32 and further through the magnetic element orifice 34.

As seen in FIG. 14, the projecting element may be a removable peg or other object, where the insertion portion 36 is inserted through the interface portion orifice 32 and at least partially into the magnetic element orifice 34, until the projecting element rim portion 40 abuts the base substrate front surface 16. In this arrangement, the extension portion 38 would continue to extend from the base substrate 12, and specifically the base substrate front surface 16. In this embodiment, without the use of the cover element 24, the projecting element 30 may be formed as part of the base substrate 12 and project directly above the magnetic element 20. See FIG. 14.

Figure 16:
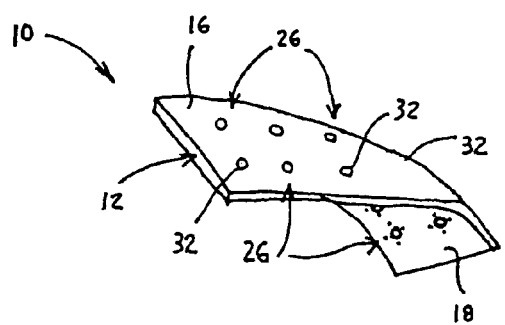
FIG. 16 is a perspective view of a still further preferred embodiment of a magnetic tool organizing system according to the present invention.

The system 10 of this embodiment may be manufactured according to the above-discussed process, or according to the manufacturing method discussed hereinafter. In addition, the base substrate 12 may be manufactured from a material that is pliable, flexible or bendable after curing. For example, as seen in FIG. 16, the base substrate 12 can be formed as a "mat", which can be easily bent, dropped or otherwise manipulated. In addition, the material of manufacture of the base substrate 12 may be generally rubber or include some other nonabrasive surface, such that the base substrate 12 can be magnetically attached to any number of metallic objects, such as the side of a car, on a wall, etc. The magnetic force of the magnetic element 20 (and typically multiple magnetic elements 20) would allow the base substrate 12 to be attached to such an object, typically at the base substrate rear surface 18. Therefore, the user would have access to the base substrate front surface 16 and the various interface portions 26 thereon.

In a further embodiment, a plurality of base substrates 12 are attached to each other along the respective periphery. Specifically, as seen in FIG. 17, a joint 80 can be formed between two base substrates 12, specifically between a first base substrate periphery 82 and a second base substrate periphery 84. This joint 80 can be made of a flexible or bendable material, such that the base substrates 12 are in a hinged relationship and can be folded at the joint 80 on top of each other, such that the base substrate surfaces 16, 18 are in contact. Furthermore, this joint 80 can be formed from the same material that the base substrate 12 is manufactured, such that the system 10 of this embodiment can be formed in a single manufacturing process.

The present invention is directed to a further method of manufacturing the magnetic tool organizing system 10 discussed above, wherein at least one magnetic element 20 is at least partially embedded within the base substrate 12. As discussed above, a magnetic element 20 is positioned on a peg element 62 extending from a form 64. The form 64 is placed in an injection molding device 66, and moldable material 68 is injected into the form 64. This results in moldable material 68 surrounding the magnetic element 20, thereby forming the base substrate 12. As discussed above, in one embodiment, the moldable material 68 is a material that is pliable, flexible and/or bendable after the moldable material 68 is cured.

As illustrated in FIG. 18, the magnetic element 20 may be embedded in the base substrate 12 during the manufacturing process using various peg elements 62 and arrangements. One arrangement illustrates a plurality of peg elements 62 on both the upper and lower portions of the magnetic element 20, such that the magnetic element 20 is held in place while the moldable material 68 is injected and cured. Further, using this arrangement would allow for the creation of multiple orifices at the interface portion 26 on the base substrate front surface 16, which will allow a greater magnetic field to eminate therefrom.

However, as also illustrated in FIG. 18, an elongated central peg element 72 may be used in connection with the peg element 62, and the central peg element 72 extends through the magnetic element orifice 34 and above the fill line of the moldable material 68. In this manner, the moldable material 68 would not be allowed to enter the magnetic element orifice 34, and once cured, the central peg element 72 would form the interface portion orifice 32. See FIG. 16.

Figure 15:
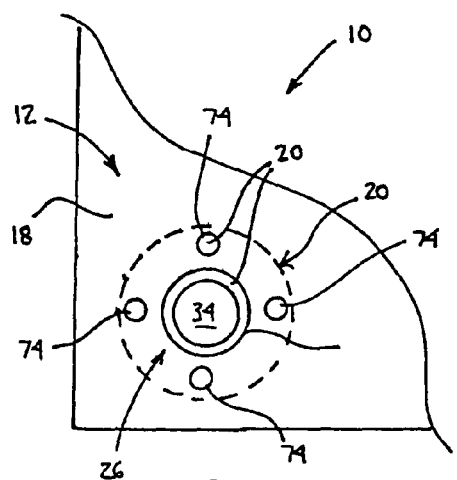
FIG. 15 is a bottom view of a preferred embodiment of a magnetic tool organizing system according to the present invention.

It is also envisioned that the magnetic element 20 does not include any magnetic element orifice 34 and is simply embedded within the base substrate 12, specifically in the inner base substrate area 14. However, in the manufacturing process discussed above, in order to allow the magnetic element 20 to be embedded within the base substrate 12, the aforementioned peg elements 62 should be used. This results in the peg element orifices 74 and the central peg element orifice 76 on the base substrate rear surface 18, as is illustrated in FIG. 15. However, it is envisioned that any manner of suspending the magnetic element 20 in the moldable material 68 until the base substrate 12 cures is envisioned.

While the base substrate rear surface 18 may include these peg element orifices 74 and central peg element orifice 76, this would not prevent the user from effectively using the base substrate rear surface 18, just as he or she would use the base substrate front surface 16. Therefore, the system 10 may be effectively used in connection with either surface 16, 18 thereof. This reversibility adds additional flexibility and beneficial functionality to the magnetic tool organizing system 10.

In this manner, the present invention provides a magnetic tool organizing system 10 that allows for increased tool organization. Further, in using the particular magnetic system disclosed herein, tools and components can be easily removed and, further, easily attached to the system 10. Still further, the use of different sizes and shapes, together with the removeability of the projecting elements 30, provides additional functionality and flexibility within the system 10. In the present system 10, the encapsulation of the magnetic element 20 and the combination of polymer and ferrous metal along with the orientation of the magnetic fields causes enhanced holding power. Also, the manufactureability and product life issues are resolved by the system 10 of the present invention, since, in one embodiment, the magnetic element 20, sandwiched between the cover element 24 and/or the rear-securing element 46 in the inner substrate area 14, can be inserted and injection molded on standard plastic processing equipment, nearly eliminating the loss of magnets and substantially reducing the number of steps in the manufacturing process, whether done manually or automatically.

Further, once the system 10 has been molded, in one embodiment the magnetic elements 20 are fully encased by metal and polymer, so that even if the magnetic element 20 is cracked or broken, there is no loss of functionality, since all of the mass of the magnetic element 20 is retained in its original configuration. The present invention allows for the economical production of magnetic tool organizers with sufficient holding power to allow vertical storage of almost any tool, such as sockets, screwdrivers, wrenches, saw blades, hammers, etc. The present invention also provides a system 10 that, in one embodiment, is in the form of a flexible "mat" structure, such that the base substrate 12 can be bent, folded, flexed or otherwise manipulated. Still further, the present invention provides for a system 10 that includes multiple attached base substrates 12 that provide even greater versatility to the system 10.

This invention has been described with reference to the preferred embodiments. Obvious modifications and alterations will occur to others upon reading and understanding the preceding detailed description. It is intended that the invention be construed as including all such modifications and alterations.

We claim:

1. A magnetic tool organizing system, comprising:
a base substrate having an inner base substrate area, a base substrate front surface and a base substrate rear surface;
at least one magnetic element positioned at least partially in the inner base substrate area of the base substrate; and at least one respective cover element including a rim portion and positioned substantially adjacent a respective said at least one magnetic element, wherein at least a portion of the rim portion of each cover element is embedded into the base substrate;

wherein the base substrate, the at least one magnetic element and the at least one cover element are molded as an integral piece, such that the at least one magnetic element is embedded directly within the inner base substrate area of the base substrate.

2. The system of claim 1, wherein the base substrate is manufactured from at least one of a polymeric material, a metal and a semi-metal.

3. The system of claim 1, wherein each respective cover element further comprises an interface portion located substantially adjacent a surface of its respective magnetic element.

4. The system of claim 3, further comprising a projecting element extending from the base substrate, wherein the interface portion includes an interface portion orifice extending therethrough and the projecting element includes an insertion portion and an extension portion, wherein the insertion portion of the projecting element is configured to be inserted at least partially through the interface portion orifice.

5. The system of claim 4, wherein the at least one magnetic element includes a magnetic element orifice, wherein the insertion portion of the projecting element is configured to be inserted at least partially through the magnetic element orifice.

6. The system of claim 4, wherein the projecting element further includes a rim portion positioned between the insertion portion and the extension portion, such that, when the projecting element is inserted through the interface portion, the rim portion abuts a surface of the interface portion of the projecting element.

7. The system of claim 3, further comprising a projecting element extending from and formed integrally with the base substrate.

8. The system of claim 3, further comprising a projecting element extending from the base substrate, wherein the projecting element is removable from the base substrate.

9. The system of claim 3, further comprising a projecting element extending from an area between at least two adjacent magnetic elements.

10. The system of claim 3, wherein the interface portion includes an interface portion orifice extending therethrough, and wherein the at least one magnetic element includes a magnetic element orifice extending therethrough, such that the interface portion orifice and the magnetic element orifice are substantially aligned.

11. The system of claim 1, wherein the at least one magnetic element is formed in a substantially circular shape.

12. The system of claim 1, further comprising a plurality of the base substrate, each with at least one embedded magnetic element therein, wherein at least two of the plurality of base substrates are attached to each other along a respective periphery thereof.

13. The system of claim 1, wherein the base substrate is manufactured from at least one of a pliable, flexible and bendable material.

14. A method of manufacturing a magnetic tool organizing system comprising: at least partially embedding at least one magnetic element and at least one corresponding cover element directly within a base substrate by molding the base substrate, the at least one magnetic element and the at least one corresponding cover element as an integral piece; and embedding at least a portion of a rim portion of the at least one corresponding cover element into the base substrate.

15. The method of claim 14, further comprising the steps of:
positioning at least one magnetic element on at least one peg element extending from a form;
placing the form in an injection molding device; and
injecting moldable material into the form, such that the moldable material at least partially surrounds the at least one magnetic element, thereby forming the base substrate with an at least one embedded magnetic element.

16. The method of claim 15, wherein the moldable material is material that is at least one of pliable, flexible and bendable after the moldable material is cured.

17. The method of claim 15, further comprising the step of positioning a plurality of magnetic elements on a corresponding plurality of peg elements.

18. The method of claim 14, further comprising the step of joining at least two adjacent ones of said base substrate along a respective periphery thereof.

19. The method of claim 18, wherein the base substrates are joined in a hinged relationship, such that two adjacent base substrates can be folded together.

20. The method of claim 18, wherein the joining step occurs during the injection process, such that the at least two adjacent base substrates are integrally formed.

* * * * *

UNITED STATES PATENT AND TRADEMARK OFFICE
CERTIFICATE OF CORRECTION

PATENT NO. : 7,735,645 B2 Page 1 of 1
APPLICATION NO. : 11/115062
DATED : June 15, 2010
INVENTOR(S) : Joyce et al.

It is certified that error appears in the above-identified patent and that said Letters Patent is hereby corrected as shown below:

Column 11, lines 8-9, Claim 1, "magnetic element is embedded" should read
-- magnetic element and at least one cover element are embedded --

Signed and Sealed this

Twenty-sixth Day of October, 2010

David J. Kappos
*Director of the United States Patent and Trademark Office*